United States Patent [19]
Fleischer

[11] Patent Number: 6,138,199
[45] Date of Patent: Oct. 24, 2000

[54] SYSTEM FOR DATA TRANSFER IN A RING TOPOLOGY COMPRISING SELECTORS TO SELECTIVELY BYPASS EXTERNAL DEVICES OR A DOWNSTREAM DEVICE BASED UPON PRESENCE INDICATIONS

[75] Inventor: Balint Fleischer, Groton, Mass.

[73] Assignee: Sun Microsystems, Inc.

[21] Appl. No.: 08/787,868

[22] Filed: Jan. 23, 1997

[51] Int. Cl.[7] .................................................. G06F 11/20
[52] U.S. Cl. .......................... 710/131; 370/258; 370/403; 710/17; 710/31; 710/38
[58] Field of Search ................................... 370/222, 258, 370/403; 371/20.6; 395/200.81; 340/825.05

[56] References Cited

U.S. PATENT DOCUMENTS

| | | | |
|---|---|---|---|
| 4,899,142 | 2/1990 | Nakayashiki et al. | 340/825.05 |
| 5,361,250 | 11/1994 | Nguyen et al. | 370/222 |
| 5,504,747 | 4/1996 | Sweazey | 370/403 |
| 5,590,124 | 12/1996 | Robins | 370/258 |
| 5,710,777 | 1/1998 | Gawne | 371/20.6 |
| 5,778,193 | 7/1998 | Eaton | 395/200.81 |

*Primary Examiner*—Thomas C. Lee
*Assistant Examiner*—Chien Yuan
*Attorney, Agent, or Firm*—Richard A. Jordan

[57] ABSTRACT

A digital data transfer system transfers digital data along a path in a ring topology. The digital data transfer system comprising a host controller and a digital data transfer subsystem. The host controller generates and receiving digital data and the digital data transfer subsystem receives the digital data from the host controller and transferring the digital data to one or more devices connectable thereto, and further receives digital data from the last of the devices connectable thereto for provision to the host controller, thereby to define the ring data transfer topology. The digital data transfer subsystem comprises an upstream port, a plurality of input/output ports and a port control. The upstream port transfers digital data from an external source to the input of the first input/output port in the series and transfers digital data received from the last input/output port in the series to the host controller. Each input/output port includes a port input terminal, a port output terminal, a device output port, a device input terminal, and an output data selector. The input/output ports are connected in series such that the port input terminal of the first input/output port in the series receives data from the upstream port, the port output terminal of the last input/output port in the series provides data to the upstream port, and the port output terminal of each of the other input/output ports in the series provides data to the port input terminal of the next input/output port in the series. Each input/output port couples data from its port input terminal to its device output terminal thereby to provide data received at its port input terminal to a device which may be connected thereto, and coupling data from its device input terminal to its respective output data selector. The output data selector of each input/output port is further connected to receive data from the respective port input terminal, the output data selector selectively coupling data from one of the port input terminal or the device input terminal to the input/output port's output terminal. The port control controls the output data selector of each the input/output port in response to a determination as to whether a respective device is connected thereto.

24 Claims, 3 Drawing Sheets

SYSTEM FOR DATA TRANSFER IN A RING TOPOLOGY COMPRISING SELECTORS TO SELECTIVELY BYPASS EXTERNAL DEVICES OR A DOWNSTREAM DEVICE BASED UPON PRESENCE INDICATIONS

FIELD OF THE INVENTION

The invention relates generally to the field of subsystems for transferring digital data among components of a digital data processing system, and more particularly to subsystem for transferring digital data among components connected in a ring topology. In one embodiment, the invention provides a digital data transfer subsystem for transferring digital data according to the Fibre Channel information transfer protocol.

BACKGROUND OF THE INVENTION

A digital data processing system normally comprises a number of devices which are interconnected to enable information to be transferred thereamong for processing, storage, display, printing and the like. A number of interconnection arrangements have been used in digital data processing systems. In one particular arrangement, in which information is transferred using the well-known Fibre Channel protocol, the devices are connected in a ring topology, in which device DEV(1) transfers information to device DEV(2), and so forth. The last device DEV(L) in the ring transfers information to the first device DEV(1), thereby completing the ring. A ring interconnection using the Fibre Channel protocol has a number of advantages, most notably the fact that information can be transferred very rapidly, in particular up to the gigabit-per-second range.

There are several disadvantages, however, to the use of a ring interconnection topology. One disadvantage is that adding devices to a ring interconnection can be difficult and lead to failures. In addition, if a device fails, information transferred through the interconnection, can be stopped or corrupted, depending on the cause of the failure, and locating the particular failing device and isolating the device can be difficult.

SUMMARY OF THE INVENTION

The invention provides a new and improved digital data transfer subsystem for transferring information among components of a digital data processing system interconnected in a ring topology.

In brief summary, the invention provides a digital data transfer system for transferring digital data along a path in a ring topology. The digital data transfer system comprising a host controller and a digital data transfer subsystem. The host controller generates and receiving digital data and the digital data transfer subsystem receives the digital data from said host controller and transferring said digital data to one or more devices connectable thereto, and further receives digital data from the last of said devices connectable thereto for provision to said host controller, thereby to define the ring data transfer topology. The digital data transfer subsystem comprises an upstream port, a plurality of input/output ports and a port control. The upstream port includes an input terminal for receiving digital data from the host controller to the input of the first input/output port in the series and an output terminal for transferring digital data received from the last input/output port in the series to the host controller. Each input/output port includes a port input terminal, a port output terminal, a device output port, a device input terminal, and an output data selector. The input/output ports are connected in series such that the port input terminal of the first input/output port in the series receive data from said upstream port input terminal, the port output terminal of the last input/output port in the series provides data to the upstream port output terminal, and the port output terminal of each of the other input/output ports in the series provides data to the port input terminal of a respective next of the input/output ports in the series. Each input/output port further couples data from its respective port input terminal to its respective device output terminal thereby to provide data received at its port input terminal to a device which may be connected thereto, and coupling data from its device input terminal to its respective output data selector. The output data selector of each input/output port is further connected to receive data from the respective port input terminal, the output data selector selectively coupling data from one of the said port input terminal or said device input terminal to the input/output port's respective output terminal. The port control controls the output data selector of each said respective input/output port in response to a determination as to whether a respective device is connected thereto.

The digital data transfer system in accordance with the invention provides a number of advantages. In particular it provides for simplified connection of devices, in a ring topology interconnection, and avoids complex cabling which is often required, particularly in systems in which the Fibre Channel protocol is used, since an input/output port will automatically bypass its device port terminals if no device is connected thereto. In addition, the invention allows devices which are connected to the digital data transfer subsystem to automatically disconnect themselves from the digital data transfer subsystem if they determine that they are malfunctioning, by providing that, if a malfunction occurs, the port control will operate as if no device were connected thereto, effectively bypassing the malfunctioning device and protecting the information transfer path. A further aspect of the invention provides for program control of the digital data transfer subsystem by the host controller to control isolation of malfunctioning devices while protecting the information transfer path.

BRIEF DESCRIPTION OF THE DRAWINGS

This invention is pointed out with particularity in the appended claims. The above and further advantages of this invention may be better understood by referring to the following description taken in conjunction with the accompanying drawings, in which:

DETAILED DESCRIPTION OF AN ILLUSTRATIVE EMBODIMENT

The invention provides a digital data transfer subsystem for transferring digital data among devices comprising, for example, a digital computer system. In one embodiment, which will be described below, the transfer subsystem transfers digital data between a host controller and one or more disk storage devices connected thereto. The host controller and disk storage devices are interconnected in network which is organized in a ring topology, and in one embodiment comprises the well-known Fibre-Channel network. The digital transfer subsystem provides an arrangement which simplifies interconnection of the host controller and variable numbers of the disk storage devices in the network.

Figure 1A:
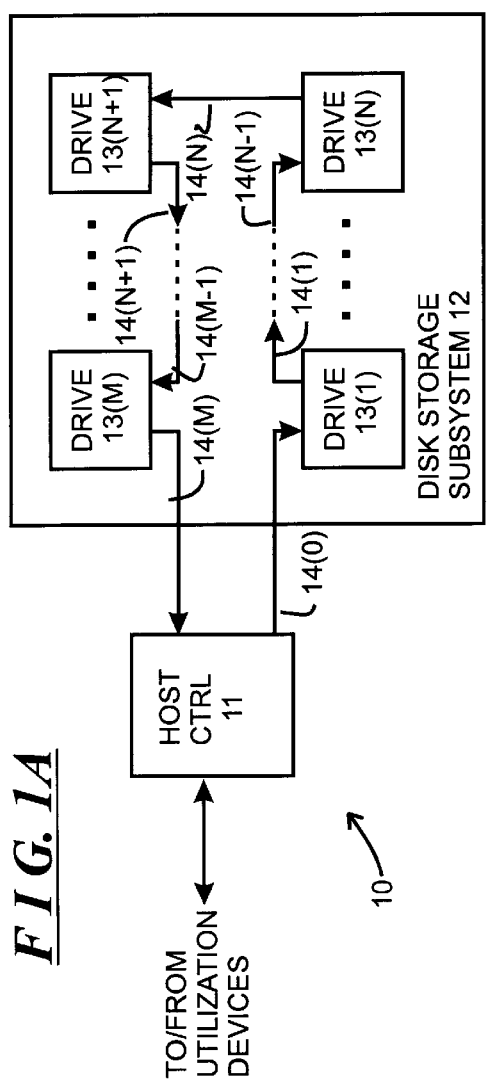
FIGS. 1A and 1B are functional block diagrams depicting systems that are useful in understanding the invention.
Figure 1B:
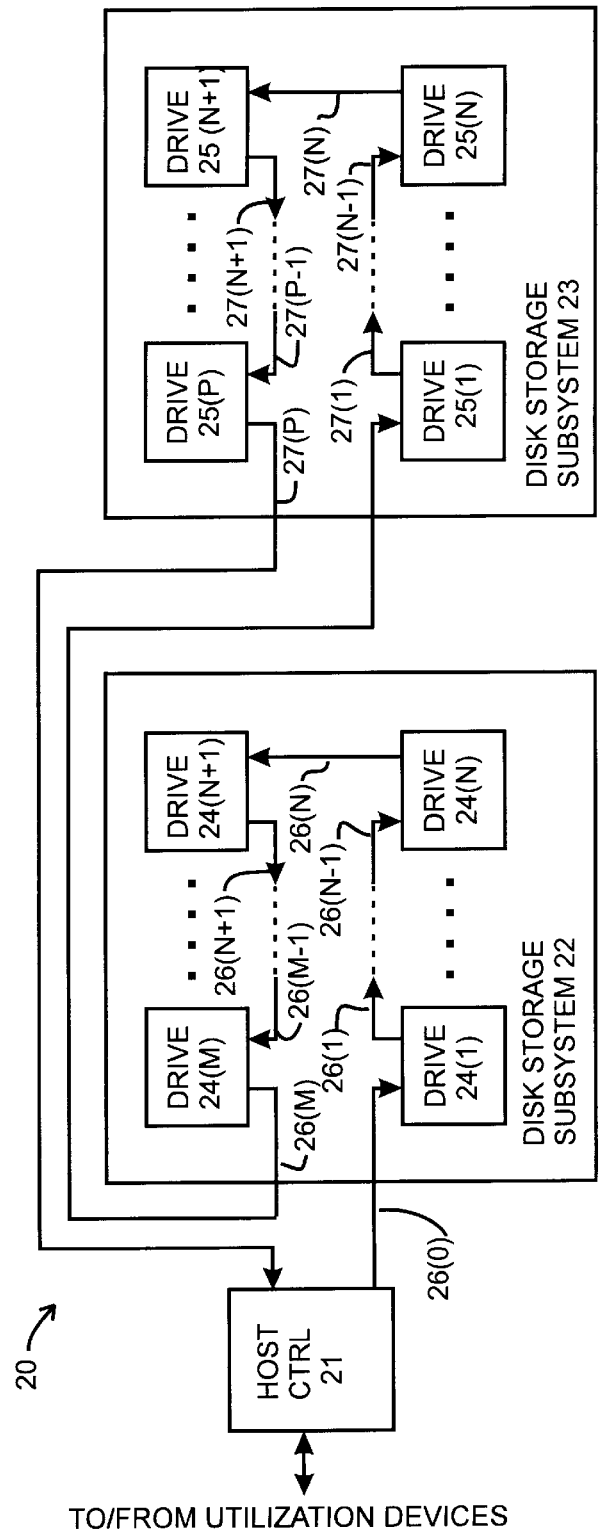

FIGS. 1A and 1B are functional block diagrams depicting respective mass storage subsystems 10 and 20 that are useful in understanding the basic topology of the network used in connection with the invention. With reference to FIG. 1A, mass storage subsystem 10 includes a host controller 11 and a disk storage subsystem 12 comprising a number of disk drive units 13(1) through 13(M) (generally identified by reference numeral 13(m)). The host controller 11 receives data storage and/or retrieval requests from other devices (not shown), which are generally referred to in FIG. 1A as "utilization devices." The utilization devices may comprise any of a number of devices for generating digital data for storage and or retrieving digital data for utilization, including, for example, digital computer systems such as personal computers, computer workstations or the like which generate processed data for storage on the disk drive units 13(m) comprising the disk storage subsystem 12, and which retrieve data stored on the disk drive units 13(m). When a utilization device wishes to store data on the disk storage subsystem 12, it will generally issue a storage command therefor along with the data to be stored to the host controller 11. The host controller 11, in turn, will transfer the storage command and data to be stored to the disk drive unit 13(m) to store the data, and the disk drive unit 13(m), in turn, will store the data. On the other hand, when a utilization device wishes to retrieve data from the disk storage subsystem 12, it issue a retrieval command therefor to the host controller. The host controller 11 will transfer the retrieval command to the disk drive unit 13(m) on which the data is stored, and the disk drive unit 13(m), in turn, provide the data to the host controller 11. The host controller 11, after receiving the data requested by the utilization device from the disk drive unit 13(m), can provide the data to the utilization device which requested the data. The host controller 11 can also initiate a number of other operations in connection with the disk drive units 13(m), including, for example, retrieving status information from respective disk drive units 13(m) and performing maintenance and diagnostic operations in connection therewith.

The disk drive units 13(m) comprising disk storage subsystem 12 and the host controller 11 interconnected over communication links 14(1) through 14(M-1), and disk drive units 13(1) and 13(M) are also connected to the host controller 11 over respective communication links 14(0) and 14(M) (the communication links will be generally identified by reference numeral 14(m)). The interconnection is in the form of a ring topology in which the host controller 11 transfers information, including data and commands, to the disk drive unit 13(1), and receives information, including data and status information from the disk drive unit 13(M). Each disk drive unit 13(m) in the disk storage subsystem 12 will receive information from an upstream disk drive unit 13(m-1), or from the host controller 11 in the case of the disk drive unit 13(1), and will transfer information to the downstream disk drive unit 13(m+1), or to the host controller 11 in the case of the disk drive unit 13(M). If the information is to be used by the respective disk drive unit 13(m), which may be the case in connection with commands for and data to be stored on the particular disk drive unit 13(m), the disk drive unit 13(m) can also receive and use the information received from disk drive unit 13(m-1), or the host controller 11 in the case of the disk drive unit 13(1). Depending on the particular protocol used by the network interconnecting the disk drive units 13(m), when a particular disk drive unit receives and information from an upstream disk drive unit 13(m-1), it may also transfer the information to the downstream disk drive unit 13(m+1), or it may alternatively block transmission of the information.

Generally, the disk storage subsystem 12 used in mass storage subsystem 10 will comprise a predetermined maximum number "$M_M$" of disk drive units 13(m) and provide interconnections for that maximum number. In a particular embodiment, the disk storage subsystem 12 may comprise a number "M" of disk drive units 13(m) which is less than the maximum number $M_M$. In that embodiment, in order to increase the number of disk drive units 13(m) included in the mass storage subsystem 10, a second disk storage subsystem is added to the mass storage subsystem to form mass storage subsystem 20, which is depicted in FIG. 1B. The mass storage subsystem 20 depicted in FIG. 1B comprises a single host controller 21 connected to control a plurality of disk storage subsystems 22 and 23. Each of the disk storage subsystems 22 and 23 is similar to the disk storage subsystem 12 described above in connection with FIG. 1A, and includes one or more disk drive units 24(1) through 24(M) (generally identified by reference numeral 24(m)) in the case of disk storage subsystem 22, and 25(1) through 25(P) (generally identified by reference numeral 25(p)) in the case of disk storage subsystem 23. Each of the disk storage subsystems 22 and 23 also comprises a respective maximum number of disk drive units, in particular "$M_M$" disk drive units 25(m) in the case of disk storage subsystem 23 and "$P_M$" disk drive units 26(p) in the case of disk storage subsystem 24. In one embodiment, the maximum numbers of disk drive units 25(m) and 26(p) which may be included in respective disk storage subsystem 22 and 23, are the same, in which case $M_M=P_M$. It will be appreciated, however, that in other embodiments the maximum numbers of disk drives which may be included in respective disk storage subsystems may differ.

The structure and operation of the respective disk storage subsystems 23 and 24 are similar, and are similar to the structure of disk storage subsystem 12 depicted in FIG. 1A. In particular, successively-indexed disk drive units 24(m) within disk storage subsystem 22 are serially interconnected by communication links 26(1) through 26(M-1). Similarly, successively-indexed disk drive units 25(p) within disk storage subsystem 23 are serially interconnected by communication links 27(1) through 27(P-1). In addition, the disk drive unit 26(1) is connected to host controller 21 over communication link 26(0). In the mass storage subsystem 20, the disk drive unit 26(M), instead of being connected to host controller 21, is connected to the first disk drive unit 25(1) of the disk storage subsystem 23 over communication link 26(M), and the last disk drive unit 25(P) of the disk storage subsystem 23 is connected to the host controller 21 over communication link 27(P).

Thus, the interconnections over communication links 26(m) (index "m" from zero to "M") and 27(p) (index "p" from zero to "P") form a network having a unitary ring topology over which information can be transferred in a manner similar to that described above in connection with FIG. 1A. That is, each disk drive unit 26(m) in the disk storage subsystem 22 receives information from an upstream disk drive unit 26(m-1) or from the host controller 21 in the case of disk drive unit 26(1), and transfers information to the downstream disk drive unit 26(m+1) or to the disk drive unit 27(1) in the case of disk drive unit 26(M). Similarly, each disk drive unit 27(p) in disk storage subsystem 23 receives information from an upstream disk drive unit 27(p–1) or from the disk drive unit 26(M) in the case of disk drive unit 27(1), and transfers information to a downstream disk drive unit 27(m+1) or to the host controller 21 in the case of disk drive unit 27(P).

Conventionally in a subsystem which makes use of the Fibre Channel interconnection subsystem, addition of disk drive units can be difficult and lead to interconnection failures. In addition, if a disk drive unit fails, information transferred through the interconnection can be stopped or corrupted, depending on the cause of the failure, and locating the particular failing disk drive unit and isolating it can be difficult. To alleviate these problems, the invention provides a digital data transfer subsystem for transferring data among the host controller and disk drive units comprising one or more disk storage subsystems, which will be described in connection with FIGS. 2 and 3. The digital data transfer subsystem constructed in accordance with the invention can be implemented in a unitary electronic circuit, such as a monolithic integrated circuit chip, which provides for upstream connection to, for example, a host controller or upstream disk storage subsystem, and in addition provides for downstream connection to a downstream disk storage subsystem, as well as providing for connection to variable numbers of disk drive units within each disk storage subsystem, without requiring complex cabling changes. In addition, the digital data transfer subsystem constructed in accordance with the invention can enable failing disk drive units to be easily located and isolated, thereby protecting the information transfer path.

Figure 2:
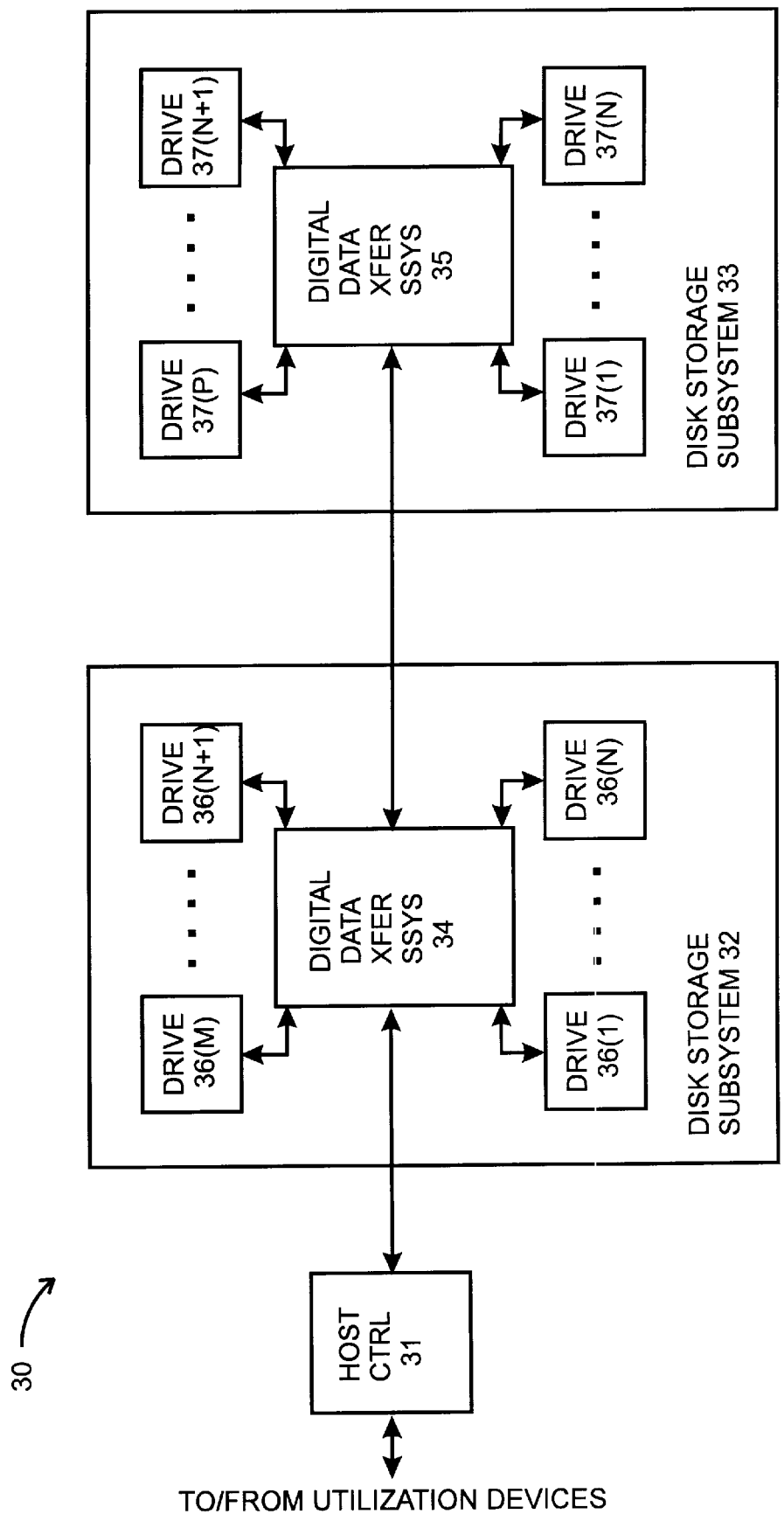
FIG. 2 is a functional block diagram of a system including a network coupler unit constructed in accordance with the invention.

FIG. 2 is a functional block diagram of a digital data storage system 30 including a digital data transfer subsystem constructed in accordance with the invention. With reference to FIG. 2, digital data storage system 30 includes a host controller 31 and two disk storage subsystems 32 and 33. Each of the disk storage subsystems 32 and 33 includes a respective digital data transfer subsystem 34, 35 and respective disk storage subsystems 36(1) through 36(M) (generally identified by reference numeral 36(m)) in the case of disk storage subsystem 32, and 37(1) through 37(P) (generally identified by reference numeral 37(p)) in the case of disk storage subsystem 33. As in digital data storage system 20 (FIG. 1B), the digital data storage systems 32 and 33 may comprise the same or differing numbers of disk drive units (in which case "M" may or may not equal "P"), and may also accommodate the same or differing maximum numbers of disk drive units (in which case "$M_M$" may or may not equal "$P_M$"). As will be apparent from the description of the digital data transfer subsystems below in connection with FIG. 3, the digital data transfer subsystem constructed in accordance with the invention can be effectively utilized in connection with disk storage subsystems which have differing numbers of disk drive units, and with such disk storage subsystems which have differing maximum numbers of disk drive units.

In digital data storage system 30 (FIG. 2) the digital data transfer subsystem 34 of disk storage subsystem 32 connects to the disk drive units 36(m) of the disk storage subsystem 32, and also to the host controller 31 and the digital data transfer subsystem 35 of disk storage subsystem 33. Similarly, digital data transfer subsystem 35 of disk storage subsystem 33 connects to the disk drive units 37(p) of the disk storage subsystem 33, and also to the digital data transfer subsystem 35 of disk storage subsystem 33. The digital data transfer subsystem 34 and 35 can provide an interconnection for the host controller 31 and disk drive units 36(m) and 37(p) of the disk storage subsystems 32 and 33 of digital data storage system 30 having a ring topology similar to that described above in connection with FIG. 1B. In addition, as will be described below in connection with FIG. 3, if the digital data storage system 30 were provided with only one disk storage subsystem 32, the digital data transfer subsystem 34 would automatically ensure that the host controller 31 and that one disk storage subsystem 32 were provided with an interconnection having a ring topology similar to that described above in connection with FIG. 1A. Similarly, if the digital data storage system includes a further disk storage subsystem (not shown) similar to disk storage subsystems 32 and 33, the digital data transfer subsystem 35 of disk storage subsystem 33 would connect to the digital data transfer subsystem (not shown) in a similar manner and provide an interconnection having a unitary ring topology.

Figure 3:
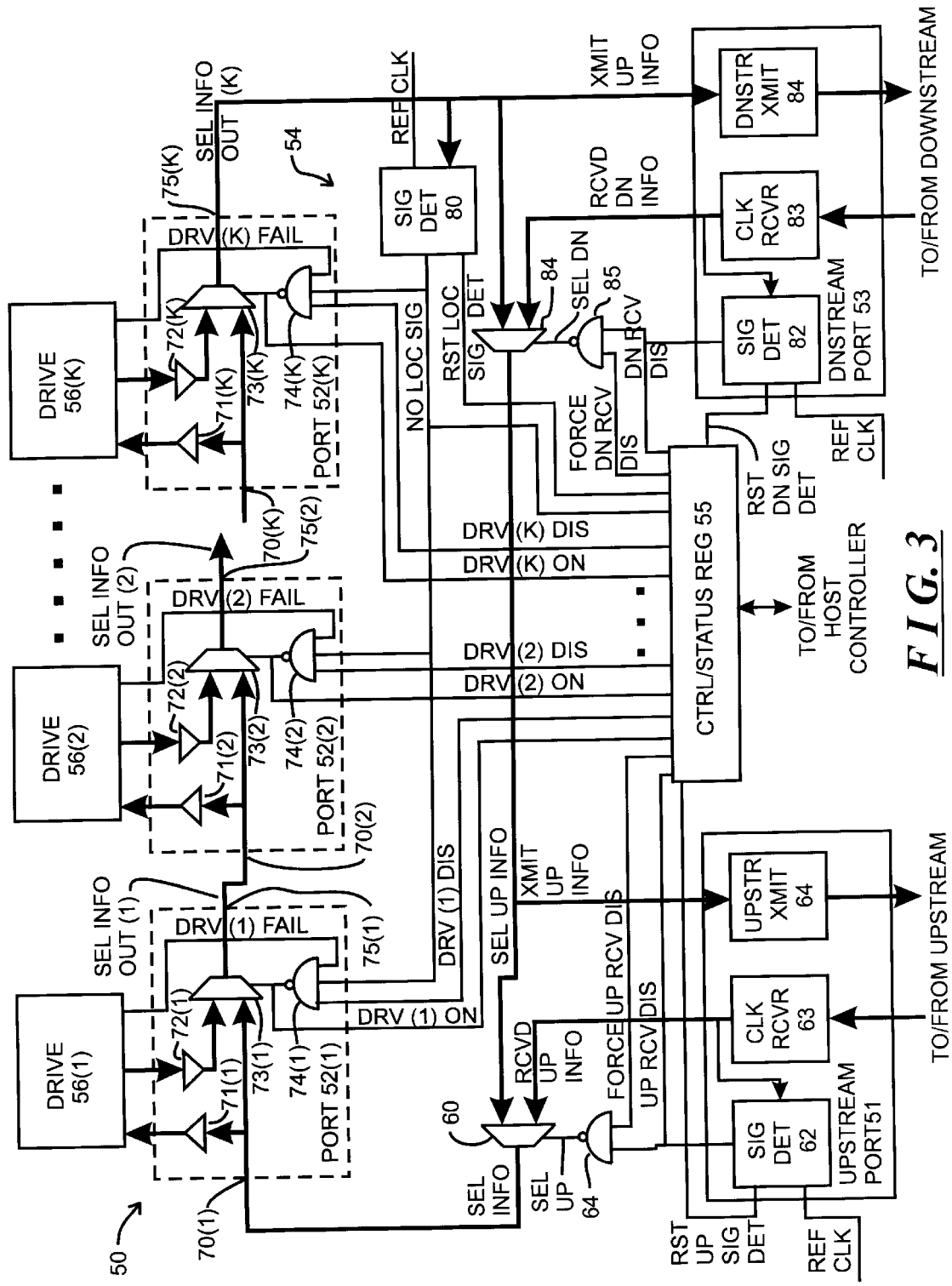
FIG. 3 is a schematic logic diagram of a network coupler unit useful in the system depicted in FIG. 2.

FIG. 3 is a schematic logic diagram of a digital data transfer subsystem, identified by reference numeral 50, useful in the system 30 depicted in FIG. 2 as digital data transfer subsystems 34 and 35. With reference to FIG. 3, the digital data transfer subsystem 50 includes an upstream port 51, a series of disk drive unit ports 52(1) through 52(K) (generally identified by reference numeral 51(k)) and a downstream port 53, all controlled by control logic generally identified by reference numeral 54 under control of a control and status register 55. The control and status register 55 provides control signals which control the operation of the other elements of the digital data transfer subsystem 50 under control of control information provided by the host controller (not shown in FIG. 3). In addition, the control and status register 55 receives status signals which indicate the status of the other elements of the digital data transfer subsystem 50, which can be retrieved from the control and status register 55 by the host controller. The control and status register 55 provides a mechanism by which program software, executed by the host controller or other devices (not shown) connected to the host controller can control the operation of the digital data transfer subsystem 50 and monitor its status.

In FIG. 3, the heavy lines schematically represent the signal path for the information transfer path described above in connection with FIGS. 1A through 2, and the lighter lines schematically represent paths for control signals which control the information transfer path. Preferably, the number of disk drive unit ports 51(k) provided by the digital data transfer subsystem 50, namely, "K," corresponds to the maximum number "$M_M$" or "$P_M$" of disk drive units to be provided in a disk storage subsystem in a digital data storage system 10 (FIG. 1A), 20 (FIG. 1B) or 30 (FIG. 2). At least some of the disk drive unit ports 51(k) are preferably connected to respective disk drive units, which are identified in FIG. 3 by reference numeral 56(k). (It will be appreciated that the disk drive units 56(k) in FIG. 3 correspond to disk drive units identified by reference numerals 13(m), 24(m) and 25(P), and 36(m) and 27(p) described above in connection with FIGS. 1A through 2, respectively.) The disk drive units 56(k) used in one embodiment of the invention can determine whether they are malfunctioning for a number of types of reasons; in that embodiment, if a disk drive unit 56(k) determines that it is malfunctioning, it will assert a DRV (k) FAIL drive (k) fail signal. On the other hand, if the disk drive unit 56(k) determines that it is not malfunctioning for one of the predetermined reason, it will negate the DRV (k) FAIL signal.

The upstream port 51 receives information from an upstream device, in particular from the host controller 31 (FIG. 2), in the case of the digital data transfer subsystem 34 in the disk storage subsystem 32, or from the disk storage subsystem 32 in the case of the digital data transfer subsystem 35 in the disk storage subsystem 33, and provides the information to a multiplexer 60 for selective transfer to the first disk drive unit port 52(1) in the series. In addition, the upstream port 51 selectively transmits information received from the last disk drive unit port 52(K) in the series, or from a downstream disk storage subsystem, upstream device, for transmission to the upstream device. The upstream port 51 includes a clock recovery unit 61, a signal detect unit 62 and an upstream transmit unit 63. The clock recovery unit 61 serves to receive the information signal provided by the upstream unit and re-shape it to ensure that it has the appropriate signal shaping and other characteristics, such as rise and fall times, as required by the particular information transfer protocol being used. In one embodiment, in which the well-known Fibre Channel protocol is used, the clock recovery unit 61 may comprise a number of well-known clock recovery circuits, including, for example, the Vitesse VSC7120 Fibre Channel repeater circuit provided by Vitesse Semiconductor Corporation. The clock recovery unit 61 processes the signal received from the upstream unit and provides it to one input of the multiplexer 60 as an RCVD__UP__INFO received upstream information signal.

The signal detect unit 62 also receives the RCVD__UP__INFO received upstream information signal from the clock recovery unit 61 and verifies that the signal is a valid signal for the particular information transfer protocol being used. In the Fibre Channel protocol, if the upstream unit is operating properly, a particular predetermined sequence or pattern of digital information bits will periodically be provided by the upstream unit to verify that it (that is, the upstream unit) is operating properly. The signal detect unit 62 monitors the RCVD__UP__INFO received upstream information signal provided by the clock recovery unit and, using a REF__CLK reference clock signal, will attempt to verify whether the upstream unit is properly providing the predetermined sequence as required by the protocol. If the signal detect unit 62 determines that the RCVD__UP__INFO received upstream information signal provided by the clock recovery unit 61 contains the required predetermined sequence, it negates an UP__RCV__DIS upstream receive disable signal. If a FORCE__UP__RCV__DIS force upstream receive disable signal from the control and status register 55 is also negated, a NAND gate 64 will assert a SEL__UP select upstream signal, which, in turn, controls the multiplexer 60 to couple the RCVD__UP__INFO received upstream information signal as the SEL__INFO selected information signal to the first disk drive unit port 52(1) in the series.

As indicated above, the digital data transfer subsystem 50 comprises a plurality of disk drive unit ports 52(k) connected in series from disk drive unit port 52(1) to disk drive unit port 52(K). At least some of the disk drive unit ports 52(k) are preferably connected to disk drive units which are identified in FIG. 3 by reference numerals 56(k). Each of the disk drive unit ports 52(k) includes an input terminal 70(k), a port driver 71(k), a port receiver 72(k), a multiplexer 73(k), a NAND gate 74(k) and an output terminal 75(k). The input terminal 70(k) of each disk drive unit port 52(k) receives an input signal from either multiplexer 60 (in particular, the SEL__INFO selected information signal) in the case of the first disk drive unit port 52(1), or from an upstream disk drive unit port 52(k−1) (in particular, a SEL__INFO__OUT (k−1) selected information out (k−1) signal) in the case of disk drive unit ports 52(k) (k≠1), and couples the input signal to both the port driver 71(k) and one input of the multiplexer 73(k). For each disk drive unit port 52(k), if a disk drive unit 56(k) is connected to the disk drive unit port 52(k), the port driver 71(k) couples the input information signal to the disk drive unit 52(k). In addition, if a disk drive unit 56(k) is connected to the disk drive unit port 52(k), the port receiver 72(k) will normally receive an information signal from the disk drive unit 56(k) which it (that is, the port receiver 72(k) will couple to the second input of the multiplexer 73(k).

The multiplexer 73(k) of each disk drive unit port 52(k) serves to selectively couple one of the signals input to the disk drive unit port 52(k), either directly from the input terminal 70(k) of the disk drive unit port 52(k) or the disk drive unit 56(k) (if any) connected to the disk drive unit port 52(k), through the output terminal 75(k). The selection by the multiplexer 73(k) is controlled by the disk drive unit port's NAND gate 74(k), which is controlled by several signals as described below. The signal selected by the multiplexer 73(k) is coupled as the respective SEL__INFO__OUT (k) selected information out signal to the next disk drive unit port 52(k) in the series in the case of disk drive unit ports 52(1) through 52(K−1), or to the downstream port 53 and control circuitry 54 in the case of disk drive unit port 52(K).

As indicated above, in each disk drive unit port 52(k), the multiplexer 73(k) is controlled by the respective NAND gate 74(k). The NAND gate 74(k), in turn, is controlled by several signals, including the DRV (k) FAIL drive (k) failed signal, the DRV(k) DIS drive (k) disable signal, and a NO LOC SIG "no local signal" signal. During normal operation, if a disk drive unit 56(k) is connected to the disk drive unit port 52(k) and is operating properly, all of the signals controlling the NAND gate 74(k) will be negated, in which case the NAND gate 74(k) will generate an asserted DRV__(k)__ON disk drive unit (k) on signal. The asserted DRV__(k)__ON disk drive unit (k) on signal, in turn, enables the multiplexer 73(k) connected thereto to couple the information signal from the port receiver 71(k) to its output terminal 75(k), thus enabling the information signal from the disk drive unit 56(k) to be coupled as the SEL__INFO__OUT (k) selected information out (k) signal to the next disk drive unit port 52(k+1) in the series, or to the downstream port 53 and control circuitry 54 in the case of the last disk drive unit port 52(K) in the series.

However, if any of the DRV (k) FAIL drive (k) failed signal, the DRV(k) DIS drive (k) disable signal, or the NO LOC SIG "no local signal" signal controlling the NAND gate 74(k) are asserted, the NAND gate 74(k) negates the DRV__(k) ON disk drive unit (k) on signal. The negated DRV__(k)__ON disk drive unit (K) on signal, in turn, enables the multiplexer 73(k) connected thereto to couple the information signal from the disk drive unit's input terminal 70(k) to its output terminal 75(k), thus effectively bypassing the disk drive unit 52(k) connected to the disk drive unit port 52(k) (if any). As indicated above, the disk drive unit 56(k) will assert the DRV (k) FAIL signal if it determines that it has malfunctioned for any of a number of reasons; thus, if the disk drive unit 56(k) detects such a malfunction and asserts the DRV (k) FAIL signal, the NAND gate 74(k) will enable the disk drive unit 56(k) to be bypassed.

The NO LOC SIG "no local signal" signal that controls NAND gate 74(k) is, in turn, controlled by the control circuitry 54. The control circuitry 54 will normally maintain the NO LOC SIG "no local signal" signal in a negated condition, but will assert the signal if it determines that the output signal provided at the output terminal 75(K) of the last disk drive unit port 52(K) in the series is corrupted. In one embodiment, in which information is transferred using the Fibre Channel protocol, the control circuitry 54 determines whether the output signal provided at the output terminal 75(K) of the last disk drive unit port 52(K) in the series is corrupted by determining whether the SEL_INFO_OUT (K) selected information out (K) signal provided thereby contains the predetermined series of information bits, and includes a signal detection unit 80 for the purpose of making that determination. The signal detection unit 80 may comprise circuitry which is similar to the circuitry comprising signal detection unit 61 of the upstream port 51 as described above. If the SEL_INFO_OUT (K) signal provided by the disk drive unit port 52(K) at its output terminal 75(K) is not corrupted, the signal detection unit 80 will maintain the NO LOC SIG "no local signal" signal in the negated condition. On the other hand, if the signal detection unit 80 determines that the SEL_INFO_OUT (K) signal provided by the disk drive unit port 52(K) is corrupted, it (that is, signal detection unit 80) will assert the NO LOC SIG "no local signal." The asserted NO LOC SIG "no local signal" signal controls all of the disk drive unit ports in tandem, so that, if the signal is asserted, all of the NAND gates 74($k$) will contemporaneously negate their DRV (k) ON drive (k) on signals. In that condition, the multiplexers 73($k$) in all of the disk drive unit ports 52($k$) will be conditioned to effectively couple the SEL_INFO selected information signal at the input terminal 70(1) of the first disk drive unit port 52(1) in the series, to the output terminal 75(K) of the last disk drive unit port 52(K) in the series as the SEL_INFO_OUT (K) selected information out (K) signal, bypassing all of the disk drive units 56($k$). When the signal detection unit 80 shifts the NO LOC SIG "no local signal" signal to the asserted condition, it will maintain it in the asserted condition until it receives a RST LOC SIG DET reset local signal detection signal from the control and status register 55.

The control and status register 55 is controlled by the host controller to which the digital data transfer subsystem 50 is connected. The host controller normally enables the control and status register 55 to maintain the DRV (k) DIS drive (k) disable signal associated with a respective disk drive units 56($k$) in the negated condition. However, the host controller may enable the control and status register 50 to assert the DRV (k) DIS drive (k) disable signal if, for example, no disk drive unit 56($k$) is connected to the disk drive unit port 52($k$) or during a diagnostic operation to test the operation of the digital data transfer subsystem 50. In addition, the host controller may enable control and status register 55 to assert the DRV (k) DIS drive (k) disable signal if, for example, a malfunction has been occurred in a disk drive unit 56($k$) which the disk drive unit is not designed to detect and for which it (that is, the disk drive unit) will not assert the DRV (k) FAIL drive (k) fail signal. Such a malfunction may be indicated by, for example, the SEL_INFO_OUT (K) selected information out (K) signal being corrupted, as will be detected by the signal detection unit 80. When the host controller enables the control and status register 55 to assert the DRV (k) DIS drive (k) disable signal, the NAND gate 74($k$) will negate the DRV_(k)_ON disk drive unit (k) on signal, thereby enabling the multiplexer 73($k$) connected thereto to couple the information signal from the port receiver 71($k$) to its output terminal 75($k$), thus bypassing the disk drive unit 56($k$).

Thus, for each disk drive unit port 52($k$), if
 (i) the DRV (k) FAIL drive (k) failed signal is negated, indicating that disk drive unit 56($k$), if any, connected to the disk drive unit port 52($k$) has not detected a malfunction,
 (ii) the NO LOC SIG "no local signal" signal is negated, indicating that the control circuitry 54 has not detected a corrupted information signal from the last disk drive unit port 52(K) in the series, and
 (iii) the DRV (k) DIS drive (k) disable signal provided by control and status register 55 is negated,
the information from the disk drive unit 56($k$) connected to the disk drive unit port 52($k$) will be coupled to the disk drive unit port's output terminal 75($k$). However, if
 (i) the DRV (k) FAIL drive (k) failed signal is asserted, indicating that disk drive unit 56($k$), if any, connected to the disk drive unit port 52($k$) has detected a malfunction,
 (ii) the NO LOC SIG "no local signal" signal is asserted, indicating that the control circuitry 54 has detected a corrupted information signal from the last disk drive unit port 52(K) in the series, or
 (iii) the DRV(k) DIS drive (k) disable signal provided by control and status register 55 is asserted,
the information signal at the disk drive unit port's input terminal 70($k$) will be coupled to its output terminal 75($k$), bypassing the disk drive unit 56($k$), if any, that is connected to the disk drive unit port 52($k$).

The downstream port 53 is similar to the upstream port 51, and includes several elements to enable information to be transferred to a downstream disk storage subsystem, if any, connected to the disk storage subsystem which includes the digital data transfer subsystem 50. The downstream port 53 includes a clock recovery unit 81, a signal detection unit 82 and a downstream transmitter 83, which perform operations similar to the clock recovery unit 61, signal detection unit 62 and upstream transmitter 63, respectively, in the upstream port 51. In particular, the downstream transmitter 83 is connected to receive the information signal from the output terminal 75(K) of the last disk drive unit port 52(K) in the series, and couple it (that is, the information signal) to the downstream disk storage subsystem, if any connected thereto.

If the disk storage subsystem including the digital data transfer subsystem 50 is connected to a downstream disk storage subsystem, the clock recovery unit 81 will receive the information signal provided by the downstream disk storage subsystem, condition it and couple it as a RCVD_DN_INFO received downstream information signal to one input of a multiplexer 84, which also comprises part of the control circuitry 54. The clock recovery unit 81 conditions the information signal it receives from the downstream disk storage subsystem in a manner similar to the conditioning performed by the clock recovery unit 61 in the upstream port 51 as described above.

The RCVD_DN_INFO received downstream information signal provided by the clock recovery unit 81 is also coupled to the signal detection unit 82, which performs an operation similar to that performed by the signal detection units 62 and 80 of the upstream port 51 and control circuitry 54, respectively, as described above. That is, it verifies that the RCVD_DN_INFO received downstream information signal received by the clock recovery unit 81, if any, is not corrupted. In the embodiment in which information is transferred using the Fibre Channel information transfer protocol, the signal detection unit 82, also using the REF_CLK reference clock signal, will verify that the conditioned information signal provided by the clock recovery unit 81 provides the proper predetermined information bit stream verifying proper operation for the Fibre Channel protocol. If the signal detection unit 82 determines that the RCVD_DN_INFO signal provided by the clock recovery unit 81 does contain the predetermined information stream for the Fibre Channel protocol, it (that is, the signal detection unit 82) will negate a DN_RCV_DIS downstream receive disable signal, which is provided to one input terminal of a NAND gate 85 in the control circuitry 54. If a FORCE_DN_RCV_DIS force downstream receive disable signal provided by the control and status register 55 is also negated, the NAND gate 85 asserts a SEL_DN select downstream signal, which, in turn, enables the multiplexer 84 to couple the RCVD_DN_INFO received downstream information signal from the clock recovery unit 81 as a SEL_UP_INFO selected upstream information signal to the upstream transmitter 63 of the upstream port 51 for transmission to the upstream unit, that is, the host controller or to the digital data transfer subsystem of the upstream disk storage subsystem, connected thereto. In addition, the SEL_UP_INFO selected upstream information signal is provided to the second input terminal of the multiplexer 60.

On the other hand, if the signal detection unit 82 determines that the RCVD_DN_INFO received downstream information signal provided by the clock recovery unit 81 does not contain the required sequence of information bits for the Fibre Channel protocol, it will assert the DN_RCV_DIS downstream error signal. In that case, the NAND gate 85 negates the SEL_DN select downstream signal, which, in turn, enables the multiplexer 84 to couple the SEL_INFO_OUT (K) selected information out (K) signal from the output terminal 75(K) of the last disk drive unit port 52(K) in the series as the SEL_UP_INFO selected upstream information signal to the upstream transmitter 63 of the upstream port 51 and the second input terminal of multiplexer 60. As noted above, the signal detection unit 82 of the downstream port 53 will assert the DN_RCV_DIS downstream receive disable signal if it determines that the RCVD_DN_INFO downstream received information signal from the clock recovery unit does not contain the required sequence of information bits for the Fibre Channel protocol, which can occur in at least two circumstances. First, the RCVD_DN_INFO signal may not contain the required sequence of information bits for the Fibre Channel protocol if the downstream device, if any, is malfunctioning. If that occurs, the signal detection unit 82, by asserting the DN_RCV_DIS downstream receive disable signal, can protect the information transfer path from downstream malfunctioning disk storage subsystems by enabling the multiplexer 84 to effectively close the ring information path interconnection ahead of the malfunctioning disk storage subsystem. In addition, if no downstream disk storage subsystem is connected to the digital data transfer subsystem 50, the RCVD_DN_INFO signal will not contain the required sequence of information bits if no downstream disk storage subsystem is connected thereto, in which case the signal detection unit 82 can enable the multiplexer 84 to close the ring information path interconnection automatically at the last disk storage subsystem. If the signal detection unit 82 determines that the RCVD_DN_INFO received downstream information signal does not contain the required sequence of information bits for the Fibre Channel protocol, it will maintain the DN_RCV_DIS downstream receive disable signal in the asserted condition until the control and status register 55 asserts a RST_DN_SIG_DET reset downstream signal detection signal.

As noted above, the control and status register 55 can also provide a FORCE_DN_RCV_DIS force downstream receive disable signal to control the NAND gate 85. The control and status register 55, under control of the host controller connected thereto, can negate the FORCE_DN_RCV_DIS signal, which effectively enables the DN_RCV_DIS downstream receive disable signal from the signal detection unit 82 to control the NAND gate 85 and multiplexer 84. On the other hand, the host controller can enable the control and status register 55 to assert the FORCE_DN_RCV_DIS force downstream receive disable signal, which, in turn, enables the NAND gate 85 to negate the SEL_DN select downstream signal. The negated SEL_DN signal, in turn, enables the multiplexer 84 to couple the SEL_INFO_OUT (K) selected information out (K) signal from the output terminal 75(K) of the last disk drive unit port 52(K) in the series to the upstream transmitter 63 of the upstream port 51 and the second input terminal of multiplexer 60.

As described above, the control and status register 55, under control of the host controller, provides control signals for controlling the other components of the digital data transfer subsystem 50. The control and status register 55 provides control signals FORCE_UP_RCV_DIS force upstream receive disable and FORCE_DN_RCV_DIS force downstream receive disable for controlling the NAND gates 64 and 84, respectively, as described above. In addition, the control and status register 55 provides control signals DRV (k) DIS drive (k) disable for controlling the NAND gates 74(k) of the disk drive unit ports 52(k) as described above. Generally, the host controller will enable the control and status register 55 to negate the DRV (k) DIS drive (k) disable signals for the disk drive unit ports 52(k) to which disk drive units 56(k) are connected, and assert the DRV (k) DIS drive (k) disable signals for the disk drive unit ports 52(k) for which no disk drive units 56(k) are connected. Furthermore, under control of the host controller, the control and status register 55 controls the RST_UP_SIG_DET reset upstream signal detection, RST_DN_SIG_DET reset downstream signal detection, and RST_LOC_SIG_DET reset local signal detection signals for controlling the signal detection units 62, 80 and 82 as described above.

The control and status register 55 also receives status signals representative of the status of the various components of the digital data transfer subsystem, which can be retrieved by the host controller. In particular, the control and status register 55 receives the DRV(k) ON drive (k) on status signals generated by the NAND gates 72(k). As described above, if a DRV (k) ON drive (k) on signal is asserted, the respective disk drive unit port 52(k) is coupling the signal from a respective disk drive unit 56(k) as the SEL_INFO_OUT (k) selected information out (k) signal, but if the DRV (k) ON drive (k) on signal is negated it (that is, the disk drive unit port 52(k)) is bypassing the respective disk drive unit 56(k). In addition, the control and status register 55 receives the UP_RCV_DIS upstream receive disable and DN_RCV_DIS downstream receive disable signals from the signal detection units 62 and 82, respectively, which provide information as to the status of the respective RCVD_UP_INFO received upstream and RCVD_DN_INFO received downstream information signal. The control and status register 55 also receives the NO LOC SIG "no local signal" signal, which provides information as to the status of the SEL_INFO_OUT (K) selected information out (K) signal from the last disk drive unit port 52(K) in the series.

With this background, the operation of the digital data transfer subsystem 50 will be described in detail in connection with FIG. 3. Generally, the host controller will enable the control and status register 55 to provide negated DRV (k) ON drive (k) on signals for the disk drive unit ports 52(k) to which disk drive units 56(k) are connected. In addition, the host controller will enable the control and status register 55 to negate the UP_RCV_DIS upstream receive disable signal and the DN_RCV_DIS downstream receive disable signal, which enable the respective signal detection units 62 and 82 to control the NAND gates 64 and 85 and, in turn, the respective multiplexers 60 and 84. Thus, if the signal detection unit 62 in upstream port 51 determines that the RCVD_UP_INFO received upstream information signal provided by the clock recovery unit 63 contains the appropriate series of information bits for the Fibre Channel protocol, it will negate the UP_RCV_DIS upstream receive disable signal, thereby to enable the NAND gate 64 to assert the SEL_UP signal to enable the multiplexer 60 to couple the RCVD_UP_INFO received upstream information signal from the clock recovery unit 63 of the upstream port 51 to as the SEL_INFO selected information signal to the input terminal 70(1) of the first disk drive unit port 52(1).

If a disk drive unit 56(1) is connected to the first disk drive unit port 52(1), it (that is, the first disk drive unit port 52(1)) provides the SEL_INFO selected information signal through driver 71(1) to the disk drive unit 56(1), and receives an information signal from the disk drive unit 56(1) through receiver 72(1). The SEL_INFO selected information signal and the information signal from the disk drive unit 56(1) are coupled to respective inputs of the multiplexer 73(1). At this point, the control and status register 55 will be negating the DRV (1) DIS drive (1) disable signal. If the disk drive unit 56(1) is also negating the DRV (1) FAIL drive (1) fail signal and the signal detection unit 80 is also negating the NO LOC SIG "no local signal" signal, the NAND gate 74(1) will assert the DRV (1) ON drive (1) on signal to enable the multiplexer 73(1) to couple the information signal from the receiver 72(1) as the SEL_INFO_OUT(1) selected information output (1) signal through output terminal 75(1) to the next disk drive unit port 52(2) in the series.

If, on the other hand, no disk drive unit is connected to the first disk drive unit port 52(1), the control and status register 55 will be asserting the DRV (1) DIS drive (1) disable signal, which enables the NAND gate 74(1) to negate the DRV (1) ON drive (1) on signal. The negated DRV (1) ON signal enables the multiplexer 73(1) to couple the SEL_INFO selected information signal received at the input terminal 70(1) as the SEL_INFO_OUT (1) selected information output (1) signal through output terminal 75(1) to the next disk drive unit port 52(2) in the series.

Similar operations will be performed by each of the disk drive unit ports 52(k) in the series of disk drive unit ports in the digital data transfer subsystem 50.

The SEL_INFO_OUT(K) selected information out (K) signal provided by the last disk drive unit port 52(K) is coupled to the downstream transmitter 84 of downstream port 53 as a XMIT_UP_INFO transmit upstream information signal. If a downstream disk storage subsystem is connected to the downstream port 53, the downstream transmitter 84 will provide the XMIT_UP_INFO signal to the downstream digital data transfer subsystem of that downstream disk storage subsystem.

The SEL_INFO_OUT(K) selected information out (K) signal is also provided to the signal detection unit 80 and to one input of multiplexer 84. If no downstream disk storage subsystem is connected to the digital data transfer subsystem 50, the RCVD_DN_INFO received downstream information signal provided by the clock recovery unit 83 will not contain the required series of information bits for the Fibre Channel protocol, in which case the signal detection unit will assert the DN_RCV_DIS downstream receive disable signal. The asserted DN_RCV_DIS signal enables the NAND gate 85 to, in turn, control multiplexer 84 to couple the SEL_INFO_OUT(K) selected information out (K) signal as the SEL_UP_INFO selected upstream information signal to the upstream transmitter 64 of the upstream port 51. The upstream transmitter 64, in turn, transmits the SEL_UP_INFO selected upstream information signal to the upstream device connected thereto, which may comprise either the host controller or a digital data transfer subsystem of an upstream disk storage subsystem.

Similarly, if a downstream disk storage subsystem is connected to the digital data transfer subsystem 50, but the signal therefrom as received by the clock recovery unit 83 is corrupted, the RCVD_DN_INFO received downstream information signal provided by the clock recovery unit 83 also will not contain the required series of information bits for the Fibre Channel protocol. In that case, the signal detection unit 82 will also assert the DN_RCV_DIS downstream receive disable signal to enable the NAND gate 85 to control multiplexer 84 to couple the SEL_INFO_OUT(K) selected information out (K) signal as the SEL_UP_INFO selected upstream information signal to the upstream transmitter 64 of the upstream port 51. The upstream transmitter 64, in turn, transmits the SEL_UP_INFO selected upstream information signal to the upstream device connected thereto, which may comprise either the host controller or a digital data transfer subsystem of an upstream disk storage subsystem. Thus, if no downstream device is connected to the downstream port 53, or if a downstream device is connected but its signal as received by clock recovery unit 83 is corrupted, the upstream transmitter 64 will transmit as the SEL_UP_INFO selected upstream information signal, the SEL_INFO_OUT(K) selected information out (K) signal from the last disk drive unit port 52(K) in the series.

The SEL_INFO_OUT(K) selected information out (K) signal from the last disk drive unit port in the series is also coupled to the signal detection unit 80. While the signal detection unit 80 determines that the SEL_INFO_OUT(K) signal is not corrupted, it will maintain the NO LOC SIG "no local signal" signal in a negated condition. However, if the signal detection unit 80 determines that the SEL_INFO_OUT(K) signal is corrupted, it will assert the NO LOC SIG signal, which enables the NAND gates 74(k) of all of the disk drive unit ports 52(k) to negate their respective DRV (k) ON signals, in turn enabling the multiplexer 73(1) to couple the SEL_INFO selected information signal and multiplexers 73(k) to couple the respective SEL_INFO_OUT(k−1) signals received at their input terminals 70(k) to their respective output terminals. In addition, the NO LOC SIG signal and the DRV (k) ON disk drive unit on signals are received and latched by the control and status register 55, from which they can be retrieved by the host controller.

Thus, the host controller, by retrieving the contents of the control and status register 55, can determine whether the signal detection unit 80 has determined that SEL_INFO_OUT(K) selected information out (K) signal from the last disk drive unit port 52(K) in the series is corrupted. If the host controller determines that the SEL_INFO_OUT(K) signal is corrupted, it can determine which of the disk drive units 56(k) is providing a corrupted signal by, in a series of iterations, enabling the control and status register 55 to assert the DRV (k) DIS disk drive unit (k) disable signal(s) associated with one or more of the disk drive unit ports 52(k) and assert the RST_LOC_SIG_DET reset local signal detection unit signal to reset the signal detection unit 80. It will be appreciated that enabling the control and status register 55 to assert the DRV (k) DIS disk drive unit (k) disable signal, the respective NAND gate 74(k) will negate the DRV (k) ON disk drive unit (k) on signal, to enable the multiplexer 73(k) to bypass the disk drive unit 56(k), if any, connected thereto. If, after each iteration, the signal detection unit 80 determines that the SEL_INFO_OUT(K) selected information out (K) signal is still corrupted, it will assert the NO LOC SIG "no local signal" signal. On the other hand, if after each iteration the signal detection unit 80 determines that the SEL_INFO_OUT(K) selected information out (K) signal is not corrupted, it will negate the NO LOC SIG "no local signal" signal. In either case, the NO LOC SIG "no local signal" signal will be latched by the control and status register 55, and the host controller can retrieve the contents of the control and status register 55 to determine the condition of the SEL_INFO_OUT (K) signal. If it determines that the SEL_INFO_OUT(K) selected information out (K) signal is corrupted, the host controller can determine that the disk drive unit(s) for which it enabled the control and status register 55 to assert the DRV (k) DIS disk drive unit (k) disable signal during the iteration are not malfunctioning and it can thereafter enable the control and status register 55 to again negate the DRV (k) DIS disk drive unit (k) disable signal to, in turn, enable the respective disk drive unit ports 52(k) to include the disk drive units 56(k), if any, connected thereto in the information signal path. On the other hand, if the host controller determines that the SEL_INFO_OUT(K) selected information out (K) signal is not corrupted, the host controller can determine that the disk drive unit(s) for which it enabled the control and status register 55 to assert the DRV (k) DIS disk drive unit (k) disable signal during the iteration are malfunctioning and it (that is, the host controller) can perform predetermined remedial operations, such as notifying an operator of the malfunction.

In addition, as noted above, each disk drive unit 56(k) will provide a respective DRV (k) FAIL disk drive unit (k) fail signal, which it will normally maintain in a negated condition, but will assert if it determines that it has malfunctioned according to one of a number of predetermined failure modes. If the disk drive unit 56(k) asserts the DRV (k) FAIL signal, the NAND gate 74(k) negates the DRV (k) ON disk drive unit (k) on signal, which conditions the respective multiplexer 73(k) to bypass the disk drive unit 56(k). In addition, the DRV (k) ON disk drive unit (k) on signal is latched by the control and status register 55 and the host controller can retrieve the contents of the control and status register 55 to determine whether the disk drive units 56(k) are operating properly, or whether they have malfunctioned. If the host controller determines that a disk drive unit 56(k) has malfunctioned, and it (that is, the host controller) can perform predetermined remedial operations, such as notifying an operator of the malfunction.

As described above, the signal detection unit 62 of the upstream port 51, in response to the RCVD_UP_INFO received upstream information signal, generates the UP_RCV_DIS upstream receive disable signal to enable the NAND gate 64 to control multiplexer 60. The UP_RCV_DIS upstream receive disable signal is also latched by the control and status register 55, and the host controller can determine the signal's condition by retrieving the contents of the control and status register 55. The signal detection unit 62 of the upstream port 51 may determine that the RCVD_UP_INFO signal is corrupted if, for example, a digital data transfer subsystem 50 of an upstream disk storage subsystem is providing a corrupted XMIT_UP_INFO transmit upstream information signal thereto, and in that case it can enable the multiplexer 60 to couple the SEL_UP_INFO selected upstream information signal to the first disk drive unit port 52(k) as the SEL_INFO signal to protect its information transfer path against corruption by the upstream device. After the source of corruption has been identified and isolated, as described above, for example, the host controller can enable the control and status register 55 to assert the RST UP SIG DET reset upstream signal detection signal, to reset the signal detection unit and enable it to again negate the UP_RCV_DIS upstream receive disable signal.

In addition, as described above, the signal detection unit 82 of the downstream port 53 normally will assert the DN_RCV_DIS downstream receive disable signal in two circumstances, namely, if (i) no downstream disk storage subsystem is connected to the downstream port 53 and (ii) a downstream disk storage subsystem is connected to the digital data transfer subsystem 50, but the signal therefrom as received by the clock recovery unit 83 is corrupted. If a downstream disk storage subsystem is added to the system, the host controller can enable the control and status register 55 to assert the RST DN SIG DET reset downstream signal detection signal to enable the signal detection unit 82 to negate the DN_RCV_DIS signal to enable the NAND gate 85 to, in turn, enable the multiplexer 84 to couple the RCVD_DN_INFO received downstream information signal as the SEL_UP_INFO selected upstream information signal to the upstream transmitter 64 and multiplexer 60.

Similarly, if the signal detection unit 82 has asserted the DN_RCV_DIS downstream receive disable signal because a downstream disk storage subsystem has provided a corrupted signal to the clock recovery unit 83, and if the host controller has identified and isolated the malfunctioning device, the host controller can enable the control and status register 55 to assert the RST DN SIG DET reset downstream signal detection signal to enable the signal detection unit 82 to negate the DN_RCV_DIS signal to enable the NAND gate 85 to, in turn, enable the multiplexer 84 to couple the RCVD_DN_INFO received downstream information signal as the SEL_UP_INFO selected upstream information signal to the upstream transmitter 64 and multiplexer 60.

It will be appreciated that the digital data transfer subsystem 50 in accordance with the invention provides a number of advantages. In particular it provides for simplified connection of devices, such as the disk drive units 56(k), in a ring topology interconnection, and avoids complex cabling which is often required, particularly in systems in which the Fibre Channel protocol is used. In addition, it allows units connected to the interconnection to automatically disconnect themselves from the interconnection if they determine that they are malfunctioning, which can protect the information transfer path, and provides for program control of the interconnection to control expansion of the system, by adding disk drive units 56(k) to disk storage subsystems, and in addition to add entire disk storage subsystems to the system. In addition, digital data transfer subsystem 50 allows for program control to isolate malfunctioning disk drive units 56(k), while protecting the information transfer path. Furthermore, the invention provides an arrangement by which the information signal received from the upstream unit is re-shaped to ensure that it has the appropriate signal shaping and other characteristics, such as rise and fall times, as required by the particular information transfer protocol being used, to minimize the likelihood of corruption by the input/output ports 52(k) or the disk drive units 56(k) which may be connected thereto.

It will be appreciated that a number of modifications may be made to the digital data transfer subsystem 50 and the units in which they are included. For example, while the digital data transfer subsystem 50 has been described as being connected to disk drive units 56(k), it will be appreciated that a number of types of devices can be connected thereto. In addition, while the digital data transfer subsystem 50 has been described as being for use with the Fibre Channel protocol, it will be appreciated that other types of protocols can be used. If a digital data transfer subsystem makes use of another information transfer protocol, it will be appreciated that the components of the upstream and downstream ports 51 and 53 will accommodate the particular protocol used.

It will be appreciated that a system in accordance with the invention can be constructed in whole or in part from special purpose hardware or a general purpose computer system, or any combination thereof, any portion of which may be controlled by a suitable program. Any program may in whole or in part comprise part of or be stored on the system in a conventional manner, or it may in whole or in part be provided in to the system over a network or other mechanism for transferring information in a conventional manner. In addition, it will be appreciated that the system may be operated and/or otherwise controlled by means of information provided by an operator using operator input elements (not shown) which may be connected directly to the system or which may transfer the information to the system over a network or other mechanism for transferring information in a conventional manner.

The foregoing description has been limited to a specific embodiment of this invention. It will be apparent, however, that various variations and modifications may be made to the invention, with the attainment of some or all of the advantages of the invention. It is the object of the appended claims to cover these and such other variations and modifications as come within the true spirit and scope of the invention.

What is claimed as new and desired to be secured by Letters Patent of the United States is:

1. A digital data transfer subsystem for transferring digital data among one or more of a plurality of external devices, said digital data transfer subsystem comprising:

A. an upstream port configured to receive data from an upstream device and transfer data to said upstream device;

B. a downstream port configured to receive data from a downstream device, said downstream interface being further configured to generate a downstream source present determination indicating whether a downstream device is connected thereto;

C. a plurality of serially-connected input/output ports, each input/output port including a port input terminal configured to receive data from said upstream port or an upstream one of said input/output ports, a port output terminal configured to transfer data to a downstream one of a said input/output ports or a downstream data selector, a device output port configured to couple digital data received at said port input terminal to an external device which may be connected to the respective input/output port and a device input terminal configured to receive digital data from a said external device which may be connected to the respective input/output port, and an output selector configured to selectively couple digital data from one of said port input terminal and said device input terminal to the respective port output terminal;

D. the downstream data selector being configured to selectively couple data received by said downstream port or provided by one of said input/output ports to said upstream interface in response to the downstream source present determination; and E. a input/output port controller configured to control the output selector of each said respective input/output port in response to the presence of a respective external device connected thereto.

2. A digital data transfer subsystem as defined in claim 1 in which said input/output port controller is configured to control the output selector of each said respective input/output port to couple digital data from said respective input/output port's port input terminal to the respective port output terminal if no external device is connected to the respective input/output port's device input terminal.

3. A digital data transfer subsystem as defined in claim 1 in which said input/output port controller is configured to control the output selector of each said respective input/output port to couple digital data from said respective input/output port's device input terminal to the respective port output terminal if a said external device is connected to the respective input/output port's device input terminal.

4. A digital data transfer subsystem as defined in claim 1 in which said input/output port controller is configured to determine whether, for each respective input/output port, an external device is connected to said input/output port's input terminal controller in response to an external device present indication generated by a said external device connected to the respective input/output port.

5. A digital data transfer subsystem as defined in claim 4 in which a said external device connected to a said input/output port further negates a said external device present indication generated thereby in response to a predetermined occurrence in said external device.

6. A digital data transfer subsystem as defined in claim 5 in which a said external device connected to a said input/output port negates a said external device present indication generated thereby in response to a predetermined malfunction in said external device.

7. A digital data transfer subsystem as defined in claim 1 in which the first of said input/output ports in said series receives at its input port data from said upstream port.

8. A digital data transfer subsystem as defined in claim 1 in which said upstream port further couples data from the output port of the last of said input/output ports in said series to said upstream device.

9. A digital data transfer subsystem as defined in claim 7 in which the last of said input/output ports in the series is configured to couple its output port data to said downstream port and to said downstream data selector.

10. A digital data transfer subsystem as defined in claim 9 in which said downstream port includes a downstream source detector configured to generate said downstream source present determination.

11. A digital data transfer subsystem as defined in claim 10 in which said downstream source detector comprises a data signal detector configured to detect a data signal received by said downstream port, the data signal detector being responsive to detection of a data signal received by said downstream port for enabling the downstream source data selector to couple data from said downstream port to said upstream port for transfer to said upstream destination, and otherwise enabling the downstream source selector to couple data from the last of said input/output ports in said series to said upstream port.

12. A digital data transfer subsystem as defined in claim 11 further comprising an upstream source data selector configured to selectively couple data from one of said upstream port and said upstream destination data selector for provision to the first input/output port in the series.

13. A digital data transfer subsystem as defined in claim 12 in which said upstream port includes an upstream source detector configured to generate an upstream source present determination indicating whether an upstream source is connected to said upstream port, the upstream source data selector operating in response to said upstream source present determination.

14. A digital data transfer subsystem as defined in claim 13 in which said upstream source detector comprises a data signal detector configured to detect a data signal received by said upstream port, the data signal detector being responsive to detection of a data signal received by said upstream port for enabling the upstream source data selector to couple data from said upstream port to the first of said input/output ports in the series, and otherwise enabling the upstream source selector to couple data from the upstream destination data selector to the first of said input/output ports in the series.

15. A digital data transfer subsystem as defined in claim 14 further comprising an external control configured to control said upstream source data selector and said upstream destination data selector in response to control indications received from an external control device.

16. A digital data transfer subsystem as defined in claim 1 further comprising a data corruption detector configured to generate a data corruption indication indicating whether data provided by the last of said input/output ports in said series is corrupted, the data corruption detector controlling the output selectors of said input/output ports in response to said data corruption indication.

17. A digital data transfer subsystem as defined in claim 16 in which, if the data corruption indication indicates that data provided by the last of said input/output ports in said series is corrupted, the output selectors of all of said input/output ports are controlled to couple data from their respective port input terminals to their respective port output terminals.

18. A digital data transfer subsystem as defined in claim 1 further comprising an external control interface configured to receive control indications from an external control device, the external control interface being connected to said input/output ports and configured to control their respective output selectors.

19. A digital data transfer subsystem as defined in claim 1 in which said input/output port controller is further configured to receive operational status indications from said input/output ports, which operational status indications are retrievable by said external control device.

20. A digital data transfer subsystem as defined in claim 1 further comprising a clock receiver configured to receive a data signal defining said data from said upstream source, said clock receiver shaping the data signal in a predetermined manner.

21. A digital data transfer subsystem as defined in claim 1 in which said digital data transfer subsystem is formed from a monolithic integrated circuit chip.

22. A digital data transfer system for transferring digital data along a path in a ring topology, said digital data transfer system comprising:
   A. a host controller for generating and receiving digital data,
   B. a digital data transfer subsystem for receiving digital data from said host controller and transferring said digital data to one or more devices connectable thereto, the digital data transfer subsystem further receiving digital data from the last of said devices connectable thereto for provision to said host controller, thereby to define a ring data transfer topology,
   said digital data transfer subsystem comprising:
      i. an upstream port including an input terminal for receiving digital data from the host controller to the input of the first input/output port in the series and an output terminal for transferring digital data received from the last input/output port in the series to the host controller,
      ii. a downstream port configured to transfer data to a downstream device and receive data to said downstream device, said downstream interface being further configured to generate a downstream source present determination indicating whether a downstream device is connected thereto,
      iii. a plurality of input/output ports, each input/output port including a port input terminal, a port output terminal, a device output port, a device input terminal, and an output data selector,
         a. the input/output ports being connected in series such that the port input terminal of the first input/output port in the series receiving data from said upstream port input terminal, the port output terminal of the last input/output port in the series providing data to a downstream data selector, and the port output terminal of each of the other input/output ports in the series being connected to provide digital data to the port input terminal of a respective next of the input/output ports in the series,
         b. each input/output port further coupling data from is respective port input terminal to its respective device output terminal thereby to provide data received at its port input terminal to a device which may be connected thereto, and coupling data from its device input terminal to its respective output data selector,
         c. the output data selector of each input/output port further being connected to receive data from the respective port input terminal, the output data selector selectively coupling data from one of the said port input terminal or said device input terminal to the input/output port's respective output terminal;
      iv. the downstream data selector being configured to selectively couple data received by said downstream port or provided by one of said input/output ports to said upstream interface in response to the downstream source present determination; and
      v. a port control for controlling the output data selector of each said respective input/output port in response to a determination as to whether a respective device is connected thereto.

23. A digital data transfer method for controlling the transfer of digital data among one or more of a plurality of external devices said digital data transfer method comprising:
   A. providing an upstream port configured to receive data from an upstream device and transfer data to said upstream device;
   B. providing a downstream port configured to transfer data to a downstream device and receive data to said downstream device, said downstream interface being further configured to generate a downstream source present determination indicating whether a downstream device is connected thereto;
   C. providing a plurality of serially-connected input/output ports, each input/output port including a port input terminal configured to receive data from said upstream port or an upstream one of said input/output ports, a port output terminal configured to transfer data to a downstream one of a said input/output ports or downstream data selector, a device output port configured to couple digital data received at said port input terminal to an external device which may be connected to the respective input/output port and a device input terminal configured to receive digital data from a said external device which may be connected to the respective input/output port, D. selectively coupling digital data from one of said port input terminal and said device input terminal to the respective port output terminal;

E. controlling the selective coupling of each said respective input/output port in response to the presence of a respective external device connected thereto, and F. controlling the selective coupling of data from said downstream port or a said input/output port by said downstream data selector in response to the downstream source present determination.

24. A digital data transfer system as defined in claim 1 in which said downstream port is further configured to transfer data from a last of said serially-connected input/output ports to the downstream device.

* * * * *